United States Patent
Vandeputte

(10) Patent No.: US 6,252,635 B1
(45) Date of Patent: Jun. 26, 2001

(54) AUTOMATIC TUNING FREQUENCY OR CHANNEL NUMBER INSTALLATION

(75) Inventor: Marc G. M. Vandeputte, Brugge (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/274,392

(22) Filed: Mar. 23, 1999

(30) Foreign Application Priority Data

Mar. 26, 1998 (EP) .................................................. 98200959

(51) Int. Cl.⁷ ................................ H04N 5/50; H04B 1/18

(52) U.S. Cl. .......................... 348/731; 348/731; 348/735; 348/732; 348/733; 455/186.1; 455/185.1; 455/184.1; 455/193.1; 455/164.1; 455/192.2

(58) Field of Search ...................................... 348/731, 732, 348/735, 733; 455/5.1, 6.1, 4.2, 186.1, 185.1, 184.1, 193.1, 164.1, 164.2, 192.1, 192.2

(56) References Cited

U.S. PATENT DOCUMENTS

| | | | | |
|---|---|---|---|---|
| 4,894,714 | * | 1/1990 | Christis | 358/86 |
| 4,908,707 | * | 3/1990 | Kinghorn | 358/147 |
| 5,038,211 | * | 8/1991 | Hallenbeck | 358/142 |
| 5,253,066 | * | 10/1993 | Vogel | 358/188 |
| 5,579,061 | * | 11/1996 | Vaske | 348/731 |
| 5,732,338 | * | 3/1998 | Schwob | 455/158.5 |
| 6,025,887 | * | 2/2000 | Vaske | 348/731 |
| 6,144,843 | * | 11/2000 | Kianush et al. | 455/193.1 |

* cited by examiner

Primary Examiner—Reinhard J. Eisenzopf
Assistant Examiner—Paulos Natnael
(74) Attorney, Agent, or Firm—Edward W. Goodman

(57) ABSTRACT

Upon installation of a broadcast receiver, for example, a television receiver, the different tuning frequencies/channel numbers are to be stored in a memory of the broadcast receiver. To facilitate the installation, the network provider transmits a list of nominal tuning frequencies, for example, as a teletext page, together with at least one of the broadcast television programs. To further improve installation, also the RF frequency of a so-called subscription channel is also inserted in the list. As the RF frequency of the set-top box may differ from the nominal value in the list, a fine-tuning is performed to modify the stored tuning frequency/frequencies.

4 Claims, 1 Drawing Sheet

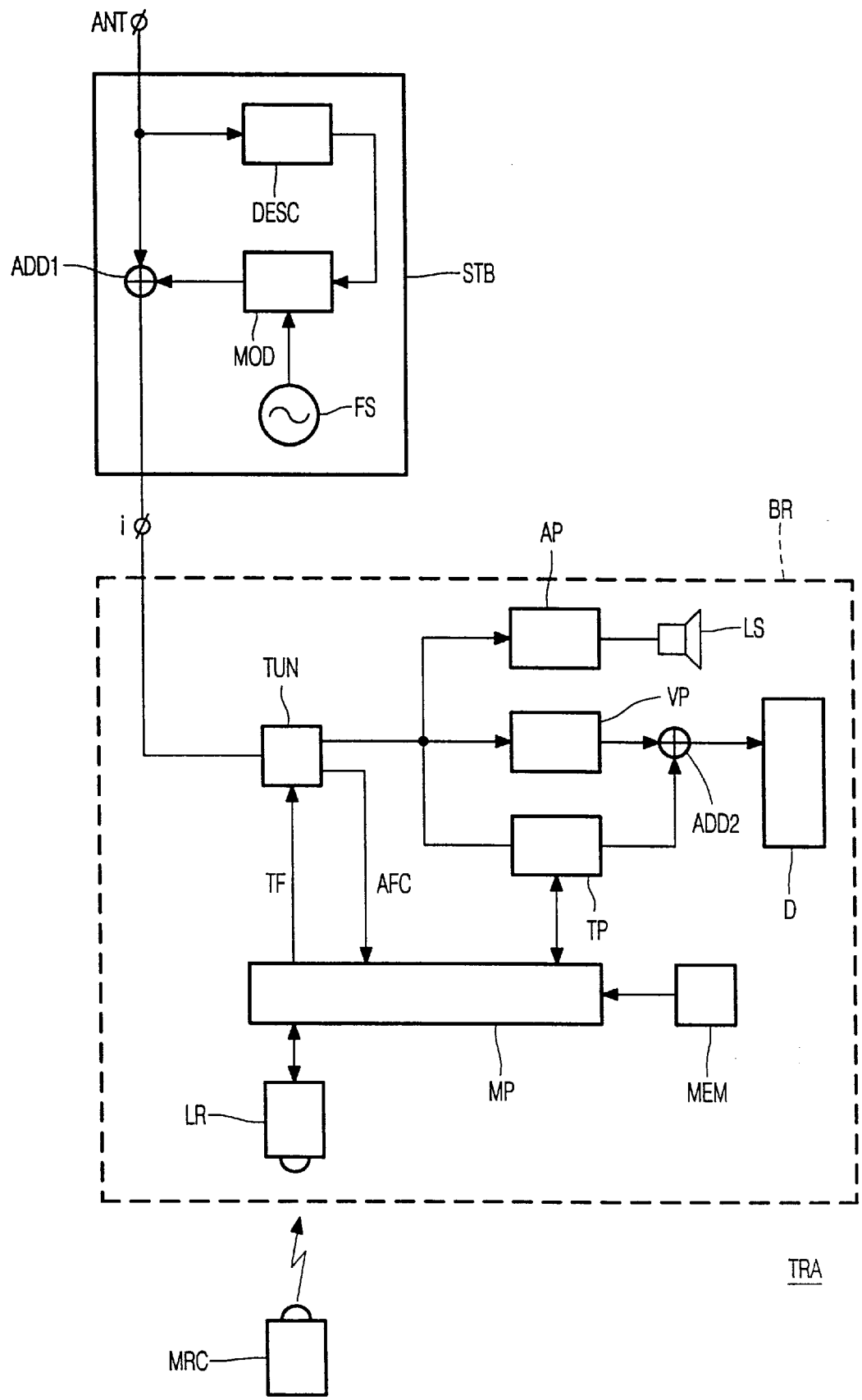

AUTOMATIC TUNING FREQUENCY OR CHANNEL NUMBER INSTALLATION

BACKGROUND OF THE INVENTION

1. Field of the Invention

The invention relates to a broadcast receiver comprising a tuner for tuning the receiver to a desired station in response to an applied tuning frequency, control means for reading said tuning frequency from a user-selected one of a plurality of memory locations in which such tuning frequencies are stored, means for receiving and decoding a list of nominal tuning frequencies identifying receivable broadcast stations and for storing said nominal tuning frequencies in respective locations of said memory. The invention also relates particularly but not exclusively to a television receiver.

The invention further relates to a method of tuning a broadcast receiver comprising the steps of reading a tuning frequency from a user-selected one of a plurality of memory locations in which such tuning frequencies are stored, and applying said tuning frequency to a tuner; and receiving a list of nominal tuning frequencies identifying receivable broadcast stations and storing said nominal tuning frequencies in respective locations of said memory.

2. Description of the Related Art

Television receivers have a frequency synthesis tuning arrangement for tuning the television receiver to a desired television station. In such an arrangement, a digital representation of the station transmission frequency is normally applied to the television tuner. This digital representation of a transmission frequency is herein further referred to as the tuning frequency. The tuning frequency is applied to the tuner by a control circuit, usually a microprocessor, in response to a channel selection made by the user.

To avoid the necessity for the user to enter difficult-to-remember transmission frequencies or channel numbers, television receivers normally allow the user to select channels by entering program numbers. In such receivers, the tuning frequencies to be applied to the tuner are stored in a tuning memory which is addressed by the program numbers assigned to the television stations.

A problem of such a television receiver is assigning the program numbers to the television stations which can be received in a given terrestrial or cable network. The initial programming of the tuning memory installation is usually referred to as channel installation.

A solution to this problem is disclosed in Applicant's U.S. Pat. No. 4,894,714. In accordance with this prior-art method, a list of nominal tuning frequencies or channel numbers of the receivable broadcast stations is transmitted by the (cable) network provider. Such a list is hereinafter referred to as channel list. In practical embodiments, the channel list is transmitted along with at least one of the broadcast television programs, e.g., as a cyclically transmitted teletext page. Upon installing the television receiver, the channel list is captured, decoded and stored in the tuning memory of the receiver without requiring any further user intervention. Thereafter, the various stations are accessible through the program numbers defined by the network provider in accordance with local habits.

SUMMARY OF THE INVENTION

It is an object of the invention to further improve the automatic channel installation process.

To this end, a first aspect of the invention provides a broadcast receiver as described above, characterized in that said control means are further arranged to determine whether a station is received upon applying the nominal frequency to the tuner and, if said determination is negative, to modify said tuning frequency within a predetermined range until a station is found and store the modified tuning frequency in the same memory location. A second aspect of the invention provides a method of tuning a broadcast receiver as described above, characterized in that the method comprises the step of determining whether a station is received upon applying the nominal tuning frequency to the tuner and, if said determination is negative, modifying said tuning frequency within a predetermined range until a station is found and storing the modified tuning frequency in the same memory location.

The invention is based on the observation of a problem occurring in cable networks with one or more subscription channels (channels that can only be viewed after decoding/descrambling). To receive such a subscription channel, a set-top box with a descrambler and an RF modulator is provided. The television receiver can only reproduce the program when the relevant RF channel is also "installed". To assist the subscriber (user) in carrying out said installation, the networks convey the RF frequency of the set-top box in the channel list as well, thereby assuming that all set-top boxes have the same RF frequency. However, the RF frequencies of the set-top boxes cannot be adjusted as precisely as those of professional transmitter stations. Consequently, the automatic installation of the subscription channel often fails. Instead of reproducing the descrambled signal when the subscription channel is selected, the television receiver is often incorrectly tuned and enters a mute mode. This leads to many complaints to the subscription channel provider.

The invention provides a solution to this problem by determining whether a station is indeed received upon tuning to the channel which is programmed in the tuning memory. If this is not the case, for example, because the tuning circuit fails to detect a carrier and/or a video synchronizing signal, the tuning frequency applied to the tuner is reduced by, say, a quarter of a TV channel bandwidth and then slightly incremented until a TV signal is detected. The tuning frequency applied to the tuner at that moment is then stored in the tuning memory. Subsequently, the television receiver will be correctly tuned when the stored tuning frequency is recalled. This "post-installing" process can be automatically carried out for each channel in the channel list after a regular installation procedure or at any convenient time upon a user request. Instead of lowering the tuning frequency, it is also possible to increase the tuning frequency and thereafter slightly decrease it until a TV signal is detected.

An embodiment in accordance with the invention comprises the broadcast receiver being a television receiver and the predetermined range extending from fn−4 MHz to fn+4 MHz, in which fn is the nominal tuning frequency.

Care should be taken not to lower or increase the tuning frequency to such a value that another tuning frequency (other channel, etc.) is found.

An embodiment in accordance with the invention comprises said step of modifying a nominal tuning frequency being carried out for each stored tuning frequency after receiving and storing the nominal frequencies.

The method can be performed for all (other) channels as a further fine tuning method.

The invention and additional features which may be optionally used to implement the invention to advantage are apparent from and will be elucidated with reference to the examples described hereinafter and shown in the FIGURE.

BRIEF DESCRIPTION OF THE DRAWING

The FIGURE shows a block diagram of a broadcast receiver arrangement including a broadcast receiver in accordance with the invention.

DESCRIPTION OF THE PREFERRED EMBODIMENTS

The FIGURE shows a block-schematic diagram of a broadcast receiver arrangement TRA including a broadcast receiver BR in accordance with the invention. At an antenna input ANT, the broadcast receiver arrangement receives a signal from, for example, an antenna or a cable antenna input. The antenna input ANT is coupled to a set-top box STB, this set-top box comprising a descrambler DESC for descrambling a received scrambled signal, and a modulator MOD for modulating the descrambled signal under control of a local oscillator Fs. This signal is coupled to an adder ADD for adding this signal to the input signal from the antenna input.

The set-top box is coupled to an input i of the broadcast receiver BR. This broadcast receiver may be, for example, a television receiver. The input i is coupled to a tuner TUN. The tuner operates under the control of a microprocessor MP which supplies a tuning frequency TF to the tuner, and the tuner supplies a signal AFC (automatic frequency control) to the microprocessor. The tuner supplies respective signals to an audio-processing unit AP, a video processing unit VP and a teletext processing unit TP. The audio-processing unit supplies a signal to a loudspeaker LS, while the video-processing unit supplies a signal to a display D via an adder ADD2. In the adder ADD2, the video signal is combined with a teletext signal from the teletext-processing unit TP. The teletext-processing unit is controlled by the microprocessor MP. The microprocessor is also coupled to a memory MEM for storing information, such as frequencies for the corresponding channels.

The microprocessor is also coupled for receiving signals from a local receiver LR, this local receiver receiving signals from a manual remote control MRC, for example, channel information, audio volume, etc.

Installation of the broadcast receiver BR is nowadays facilitated by the network providers in that they transmit a list of nominal tuning frequencies or channel numbers of the receivable broadcast stations. Such a list is hereinafter referred to as channel list. In practical embodiments, the channel list is transmitted along with at least one of the broadcast television programs, e.g., as a cyclically transmitted teletext page. Upon installing the broadcast receiver, the channel list is captured, decoded and stored in the memory MEM without requiring any further user intervention. Thereafter, the various stations are accessible through the program numbers defined by the network provider in accordance with local habits.

To receive a subscription channel, a set-top box with a descrambler and an RF modulator is provided. The broadcast (television) receiver can only reproduce the program when the relevant RF channel is also "installed". To assist the subscriber (user) in carrying out said installation, the networks convey the RF frequency of the set-top box in the channel list as well, thereby assuming that all set-top boxes have the same RF frequency. However, the RF frequencies of the set-top boxes cannot be adjusted as precisely as those of professional transmitter stations. Consequently, the automatic installation of the subscription channel often fails. Instead of reproducing the descrambled signal when the subscription channel is selected, the television receiver is often incorrectly tuned and enters a mute mode. To overcome this problem, the broadcast receiver according to the invention determines, during installation, whether a station is indeed received upon tuning to the channel which is programmed in the tuning memory. If this is not the case, for example, because the tuning circuit fails to detect a carrier and/or a video synchronizing signal, the tuning frequency applied to the tuner is reduced by, say, a quarter of a TV channel bandwidth and then slightly incremented until a TV signal is detected. The tuning frequency applied to the tuner at that moment is then stored in the tuning memory. Subsequently, the television receiver will be correctly tuned when the stored tuning frequency is recalled. This "post-installing" process can be automatically carried out for each channel in the channel list after a regular installation procedure or at any convenient time upon a user request. Instead of lowering the tuning frequency, it is also possible to increase the tuning frequency and thereafter slightly decrease it until a TV signal is detected.

Practice has proved that a range from fn−4 MHz to fn+4 MHz worked quite satisfactorily.

In the above description the idea of the invention has been described on the basis of a detailed example. Those skilled in the art will be well aware of many different solutions that fall within the scope of the invention concerned. As mentioned above, the upward or downward search can be chosen as preferred.

Furthermore the range of "fine" tuning can be chosen at will as long as it is prevented that, during fine-tuning, a channel/frequency other than the searched channel/frequency is found.

However it is not necessary for the invention that the program list is transmitted in a teletext page.

It is possible to perform the fine-tuning only for the subscription channels or for all channels. This fine-tuning may be performed any time.

What is claimed is:

1. A broadcast receiver comprising a tuner for tuning the receiver to a desired station in response to an applied tuning frequency, control means for reading said tuning frequency from a user-selected one of a plurality of memory locations in which such tuning frequencies are stored, and means for receiving and decoding a list of nominal tuning frequencies identifying receivable broadcast stations and for storing said nominal tuning frequencies in respective locations of said memory, characterized in that said control means further comprises:

means for determining whether a station is received upon applying the nominal frequency to the tuner;

means for modifying said tuning frequency within a predetermined range if said determination is negative, until a station is found; and means for storing the modified tuning frequency in the same memory location.

2. A broadcast receiver comprising a tuner for tuning the receiver to a desired station in response to an applied tuning frequency, control means for reading said tuning frequency from a user-selected one of a plurality of memory locations in which such tuning frequencies are stored, and means for receiving and decoding a list of nominal tuning frequencies identifying receivable broadcast stations and for storing said nominal tuning frequencies in respective locations of said memory, characterized in that said control means further comprises:

means for determining whether a station is received upon applying the nominal frequency to the tuner;

means for modifying said tuning frequency within a predetermined range if said determination is negative, until a station is found; and means for storing the modified tuning frequency in the same memory location, wherein the broadcast receiver is a television receiver and the predetermined range extends from fn−4 MHz to fn+4 MHz, in which fn is the nominal tuning frequency.

3. A method of tuning a broadcast receiver, comprising the steps:

reading a tuning frequency from a user-selected one of a plurality of memory locations in which such tuning frequencies are stored, and applying said tuning frequency to a tuner; and receiving a list of nominal tuning frequencies identifying receivable broadcast stations and storing said nominal tuning frequencies in respective locations of said memory, characterized in that the method further comprises the step:

determining whether a station is received upon applying the nominal tuning frequency to the tuner;

if said determination is negative, modifying said tuning frequency within a predetermined range until a station is found; and storing the modified tuning frequency in the same memory location.

4. A method as claimed in claim 3, wherein said step of modifying a nominal tuning frequency is carried out for each stored tuning frequency after receiving and storing the nominal frequencies.

* * * * *